Patented Sept. 13, 1927.

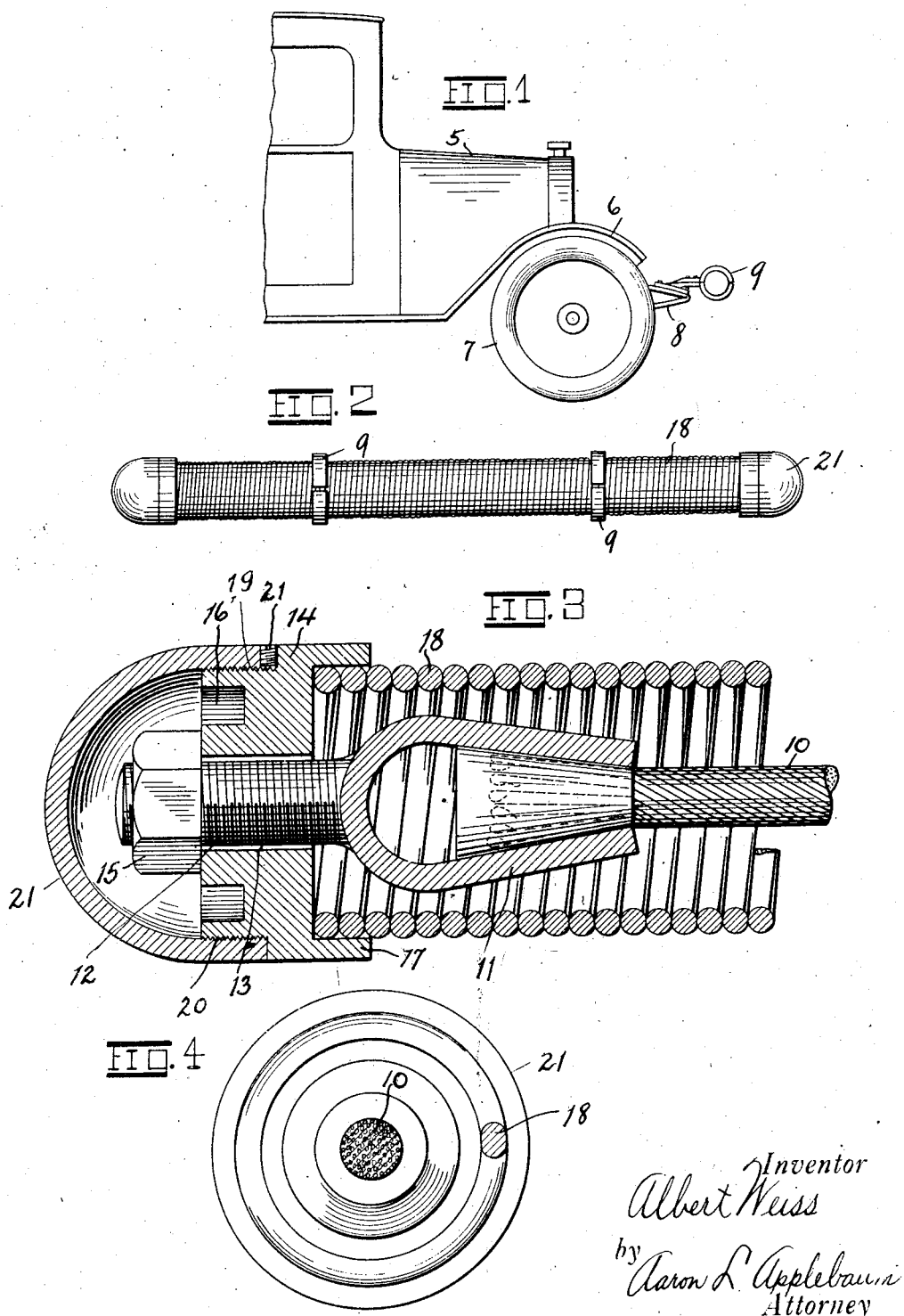

1,642,281

UNITED STATES PATENT OFFICE.

ALBERT WEISS, OF NEW YORK, N. Y.

AUTO BUMPER.

Application filed April 27, 1927. Serial No. 187,099.

This invention relates to improvements in motor vehicle bumpers or guards and has for its object to provide a novel and improved spring bumper capable of being attached either to the front or rear of a vehicle.

One of the objects of my invention is to provide a spring bumper which will quickly return to normal position when striking or being struck by an object or the portion of another machine including provision for resisting the shock incident thereto without damage or breakage of any of the parts.

Another object of my invention is to construct a spring bumper in which a central cable is encased by a coiled spring and held under tension by flanged connectors and in which the parts are constructed and arranged to resist shocks from any angle without damage to the part being struck.

To enable others skilled in the art to which the invention pertains to more fully understand and appreciate the construction and its application to motor vehicles in general, as constituting a part of my disclosure on the drawing—

Fig. 1 is a view showing the application of my invention to a motor vehicle.

Fig. 2 is a front view.

Fig. 3 is an enlarged detailed sectional view showing the relation of the parts.

Fig. 4 is a sectional view showing the cable and its relation to the outer spring.

Referring now to the drawings wherein like reference characters designate corresponding parts throughout the several views, 5 designates the body, 6 the front fender and 7 the front wheel of a conventional type of motor vehicle having the usual front springs 8. The bumper or guard proper is suitably supported by means of a pair of spring, open clamping members 9 in spaced relation between the springs of the vehicle.

A flexible cable 10 is connected at its ends to a cable end basket 11 which is substantially U-shaped in cross section, the strands of the cable being permanently held therein by poured metal such as Babbitt metal or other means well known in the art. The basket 11 is preferably formed integral with a threaded stud 12 adapted to pass through a recess 13 of a flanged connector or head 14. The said basket and connected end of the cable is tightened and placed under tension by a threaded nut 15, it being noted that sufficient clearance is provided between the end of the basket and head to permit the said cable to be placed under considerable tension. The head 14 is grooved or recessed at 16 to decrease its weight.

The flanged portion 17 of the head forms a seat for the end of a large coiled spring 18 which encircles the cable throughout its length and the end baskets 11. The cable therefor takes up and tends to resist any force directed to the spring 18 from any angle and the resiliency of the spring further tends to return the same to its normal condition.

Each head is recessed and threaded as at 19 to receive a curved end cap 20 interiorly threaded and prevented from rotation by the short screw 21. All the parts of the bumper or guard are so constructed that practically no breakage or fracture can occur and due to the resiliency of the outer spring, the tendency of the device is to quickly return to its normal condition when engaging an object as in a collision. Any distortion to the ends of the spring 18 will also be taken up by the end heads or connectors which also permits of the tightening of the bolts to any degree to render the cable taut.

While I have shown and described my invention with some degree of particularity, I realize that various changes in the details of the construction may be resorted to. For instance, the ends of the cable may be connected to the baskets by end wedges or other fastening means whereby considerable tension may be exerted on the cable and at the same time prevent its separation. I therefore do not wish to be limited and restricted to the exact details shown but reserve the right to make such changes and alterations in the structure as may fairly fall within the scope of the subject matter being claimed.

Having shown and described my invention what I claim as new and desire to secure by Letters Patent is:—

1. A bumper of the class described comprising a cable, means for securing the ends of the cable, a spring encasing the cable and a connector outside each end of the cable constituting a seat for the ends of said spring.

2. A bumper of the class described comprising a cable, means for permanently securing the ends of the cable, a coiled spring encasing the cable and the end securing means therefor and a connector outside each end of the cable constituting a seat for the ends of the said spring.

3. A bumper of the class described comprising a cable, means for securing the ends of the cable, end heads or connectors, said means passing through the heads or connectors and locked thereto and a spring encasing the cable and cable securing means, said heads or connectors constituting a seat for the ends of the said spring.

4. A bumper of the class described comprising a cable, baskets connected to the ends of the cable, end connectors, said baskets having studs passing through the connectors, means for securing the studs to said connectors and a spring encasing the cable and baskets, said connectors constituting a seat for the ends of the said spring.

5. A bumper of the class described comprising a cable, baskets connected to the ends of the cable, end connectors, said baskets having studs passing through the connectors, and nuts for locking said studs, a spring encasing the cable and baskets, said connectors constituting a seat for the ends of the said spring and end caps for the said connectors.

6. A bumper of the class described comprising a cable, baskets permanently connected to the ends of the cable, said baskets having integral threaded studs formed therewith, end connectors, said studs passing through openings in the connectors and nuts for locking the same thereto, a spring encasing the cable and said baskets, said connectors constituting a seat for the ends of the said spring and detachable end caps for the said connectors.

7. A bumper of the class described comprising a flexible cable, baskets, U-shaped in cross section permanently connected to the ends of the cable, said baskets having integral threaded studs formed therewith and disposed in the same plane as the cable, end connectors, said studs passing through openings in said connectors, nuts for locking the bolts, a spring encasing the cable and said baskets, said connectors constituting a seat for the ends of the said springs and threaded caps connected to the said connectors.

In testimony whereof I affix my signature.

ALBERT WEISS.